Patented Nov. 21, 1933

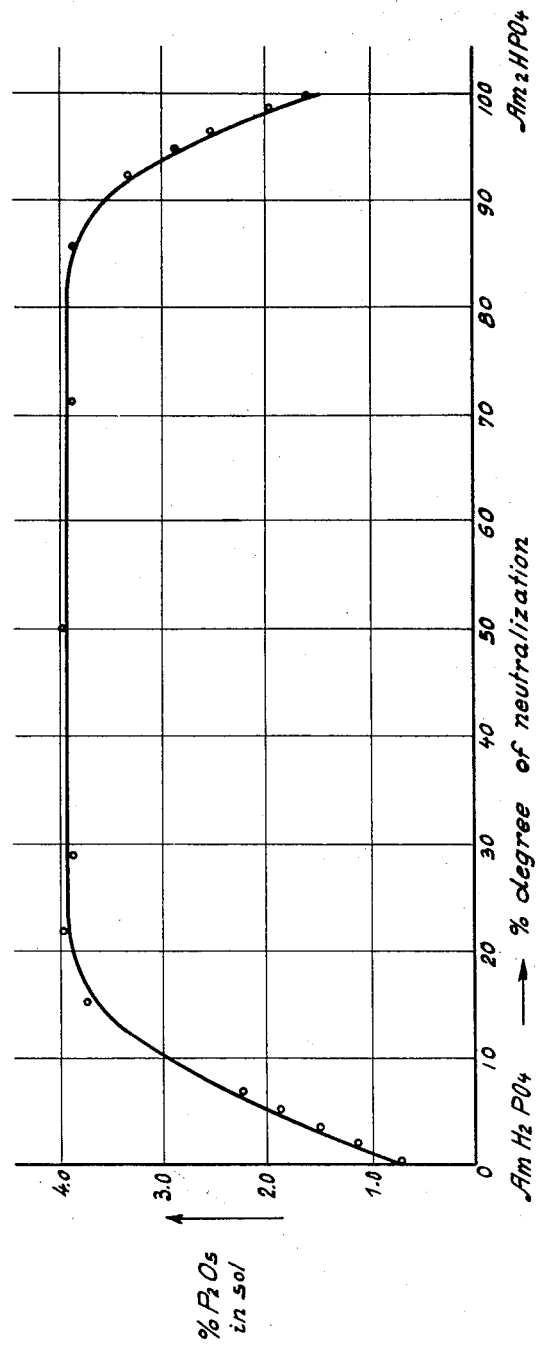

1,936,316

UNITED STATES PATENT OFFICE 1,936,316

METHOD OF LEACHING PHOSPHATE ROCK WITH NITRIC ACID AND AMMONIUM SULPHATE

Bengt Wadsted, Berlin, Germany, assignor to Kunstdünger - Patent - Verwertungs-Aktiengeselischaft, Glarus, Switzerland Application November 19, 1930, Serial No. 496,835, and in Sweden November 28, 1929

8 Claims. (Cl. 23—107)

It is known to leach phosphate rock with nitric acid in presence of ammonium sulphate, for instance according to the following reaction:

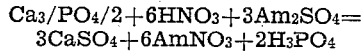

$$Ca_3/PO_4/2 + 6HNO_3 + 3Am_2SO_4 = 3CaSO_4 + 6AmNO_3 + 2H_3PO_4$$

The solution obtained in the leaching process is separated from the precipitate of calcium sulphate and other insoluble residues and is then neutralized with ammonia. In evaporating the neutralized solution a mixed fertilizer is obtained, consisting of ammonium nitrate and mono- or diammonium phosphate or a mixture of said phosphates, dependent on the quantity of ammonia added in neutralizing the solution. The ratio between phosphoric acid and nitrogen in the product produced is approximately constant, inasmuch as in neutralizing the phosphoric acid to mono-ammonium phosphate solely a product $2AmH_2PO_4.6AmNO_3$ containing 20% of $P_2O_5$ and 27,7% of $N_2$ is obtained while in neutralizing to diammonium phosphate exclusively a product $2Am_2HPO_4.6AmNO_3$ containing 19,2% of $P_2O_5$ and 30,2% of $N_2$ is obtained. In the technical performance of the process the ratio between phosphoric acid and nitrogen will be even somewhat lower than that represented by the figures above mentioned, dependent on the fact that the phosphate rock always contains impurities, such as calcium carbonate and calcium fluoride, which increase the consumption of nitric acid and ammonium sulphate over the quantity necessary to dissolve the tricalcium phosphate. Apart from the unfavourable ratio between phosphoric acid and nitrogen in the products which are obtained according to the method hitherto used said method has also another drawback in that it cannot be used for the manufacture of products having a ratio between phosphoric acid and nitrogen which can be varied within wide ranges.

This invention relates to a method of treating the solution obtained in leaching phosphate rock as above described in such manner that partly pure ammonium nitrate which has a high commercial value, and partly pure mono- or diammonium phosphate or a mixture of either of such phosphates and ammonium nitrate having a ratio between phosphoric acid and nitrogen which may be varied within wide limits are obtained.

The invention consists, chiefly, in this that the solution obtained in the leaching is first neutralized with ammonia and then concentrated by evaporation, and that the concentrated solution then is divided by cooling into a mother liquor consisting essentially of a solution of ammonium nitrate, and a crystallized salt containing phosphoric acid and nitrogen, the latter being separated and the mother liquor being purified from the remaining ammonium phopshate by the phosphoric acid being precipitated as an insoluble phosphate, and finally evaporated.

When the solution is neutralized with ammonia the impurities contained therein, such as compounds of calcium, aluminium, iron etc., are precipitated as citrate-soluble phosphates which are separated from the solution by filtering. It is, however, essential for the practical working of the invention that the addition of ammonia is not made with respect to said precipitation reactions, but it should be observed that the phosphoric acid is neutralized to form a single ammonium phosphate, i. e. either monoammonium phosphate or diammonium phosphate, because the possibility of recovering pure ammonium nitrate from the solution without large losses of soluble phosphates is essentially dependent on the discovery that pure mono-ammonium phosphate as well as pure diammonium phosphate though easily soluble in water at room temperature, are only slightly soluble in a concentrated solution of ammonium nitrate at the same temperature. A mixture of mono- and diammonium phosphate on the other hand is essentially more soluble in a cold solution of ammonium nitrate so that it would be necessary to precipitate a rather large percentage of phosphoric acid by chemical means if the phosphoric acid has been neutralized in such manner that a mixture of mono-ammonium phosphate and diammonium phosphate has been formed in the solution. Proof of said discovery was obtained by making a plurality of tests, the results of which are plotted in the form of a graph on the accompanying drawing.

When solid monoammonium phosphate is to be produced by crystallization in the solution, the latter is neutralized just to the point where monoammonium phosphate is formed where upon the solution separated from the precipitate is concentrated by evaporation. The evaporation can according to the circumstances be carried only to such a point that pure monoammonium phosphate crystallizes on the cooling of the solution, or to such a point that on cooling a mixture of monoammonium phosphate and ammonium nitrate crystallizes while the remaining mother liquor in each case consists of a saturated solution containing substantially ammonium nitrate, viz. about 61 to 62% of AmNO₃ and about 1.5 to 2% of AmH₂PO₄ only.

If on the other hand diammonium phosphate is to be separated from the solution, the latter is first neutralized to such extent that monoammonium phosphate or a mixture of monoammonium phosphate and diammonium phosphate is formed whereupon the precipitate is separated and the solution is concentrated by evaporation, ammonia being then added to the hot concentrated solution in such quantity that the monoammonium phosphate is converted into diammonium phosphate. The concentrated solution is then cooled with the effect that the diammonium phosphate nearly completely crystallizes either alone or in mixture with a greater or smaller quantity of ammonium nitrate dependent on how far the evaporation has been carried. The remaining solution contains also in this case about 61 to 62% AmNO₃ and about 1.5 to 2% Am₂HPO₄ only.

The mother liquor separated from the crystallized salt is treated with a substance, preferably a calcium compound, capable of precipitating the phosphoric acid of the ammonium phosphate still present in the mother liquor. Preferably, calcium nitrate is used for this purpose, so that the phosphoric acid is precipitated as insoluble calcium phosphate. When the solution contains monoammonium phosphate, also a small quantity of ammonia is, preferably, added to facilitate the precipitation. The solution which after the precipitation of the phosphoric acid contains ammonium nitrate only, is separated from the precipitate by filtering and is then evaporated so as to recover the ammonium nitrate in solid state. The separated precipitate may either be returned to the leaching process or be marketed as such. In the former case it is not necessary to separate it from adhering solution of ammonium nitrate while such step, preferably, is taken in the latter case.

The precipitation above mentioned is, preferably, carried out at a temperature of at least 80° C. in order to obtain the precipitated phosphate in an essentially granular form which can easily be separated from the solution by filtering.

The ammonium sulphate used in the leaching operation is, preferably, produced in well-known manner from calcium sulphate obtained in the process by treating it with ammonia and carbon dioxide or with ammonium carbonate. The calcium carbonate formed in said reaction may be used as an addition to the ammonium nitrate produced if the latter is to be used as a nitrogenous fertilizer. A small portion thereof may be dissolved in nitric acid to produce the calcium nitrate required to precipitate the phosphate in the mother liquor as described above.

*Example I.*—1214 kgs=1000 litres of a solution containing 155 kgs of AmH₂PO₄ and 345 kgs of AmNO₃ were evaporated at atmospheric pressure until a boiling point of 119 to 120° C. had been attained. In this procedure 515 kgs of water were evaporated. The remaining solution of 699 kgs was cooled to room temperature, 144 kgs of pure monoammonium phosphate being thus caused to crystallize in the solution. The remaining mother liquor of 555 kgs contained 345 kgs or 62% AmNO₃ and 11 kgs or 2% AmH₂PO₄. From this mother liquor the phosphoric acid was precipitated by means of calcium nitrate in a quantity equivalent to the ammonium phosphate together with a small quantity of ammonia whereupon the precipitate was removed by filtering and the remaining solution of pure ammonium nitrate was evaporated.

*Example II.*—1214 kgs.=1000 litres of a solution containing 155 kgs of AmH₂PO₄ and 345 kgs of AmNO₃ were evaporated at atmospheric pressure until a boiling point of 125° C. had been attained and 565 kgs of water had been evaporated. The solution was then cooled to 20° C., which caused 147 kgs of monoammonium phosphate and 85 kgs of ammonium nitrate to crystallize in the solution. The crystallized salts forming together 232 kgs of a mixed fertilizer containing 39% P₂O₅ and 20.5% N₂ were separated from the solution. The remaining mother liquor of 418 kgs containing 260 kgs of Am₂NO₃ and 8 kgs of monoammonium phosphate was treated in the same manner as in the preceding example for the recovery of pure ammonium nitrate in solid state.

By varying the degree of evaporation the quantity of ammonium nitrate crystallizing together with the ammonium phosphate can be varied at will within wide limits. One limit for such quantity is evidently given by the example above described in which pure monoammonium phosphate is brought to crystallize in the solution, the ratio P₂O₅:N₂ being in such case about 5:1, the other limit is the case in which the solution after the neutralization of the phosphoric acid to diammonium phosphate is evaporated in its entirety, a product having the ratio P₂O₅:N₂=0.63:1 being in this case obtained.

What I claim is:—

1. Method of treating solutions obtained in the leaching of phosphate rock with nitric acid and precipitation of the lime dissolved by means of ammonium sulphate, which comprises neutralizing the solution with ammonia to form a single ammonium phosphate, separating the chief portion of said ammonium phosphate from the neutralized solution by evaporation and subsequent cooling, purifying the remaining mother liquor from its content of ammonium phosphate by the precipitation of the phosphoric acid as an insoluble phosphate, and recovering the ammonium nitrate from the purified mother liquor by evaporation.

2. Method of treating solutions obtained in the leaching of phosphate rock with nitric acid and precipitation of the lime dissolved by means of ammonium sulphate, which comprises neutralizing the solution with ammonia to form a single ammonium phosphate, separating the chief portion of said ammonium phosphate together with a portion of the ammonium nitrate from the neutralized solution by evaporation and crystallization, purifying the remaining mother liquor from its content of ammonium phosphate by the precipitation of the phosphoric acid as an insoluble phosphate, and recovering the ammonium nitrate from the purified mother liquor by evaporation.

3. Method of treating solutions obtained in the leaching of phosphate rock with nitric acid and ammonium sulphate, which comprises neutralizing the solution with ammonia in such quantity that monoammonium phosphate solely is formed, separating the chief portion of said ammonium phosphate from the neutralized solution by evaporation and subsequent cooling, purifying the remaining mother liquor from its content of ammonium phosphate by the precipitation of the phosphoric acid as insoluble phosphate, and recovering the ammonium nitrate from the purified mother liquor by evaporation.

4. In a method of leaching phosphate rock with nitric acid and ammonium sulphate, the process which comprises neutralizing the solution obtained in the leaching operation with ammonia to form a single ammonium phosphate, separating the chief portion of the ammonium phosphate from the solution by evaporation and crystallization, adding soluble calcium salt to the mother liquor so as to precipitate its content of phosphoric acid as insoluble calcium phosphate, returning the precipitate to the leaching process, and recovering the ammonium nitrate from the remaining solution by evaporation.

5. In a method of leaching phosphate rock with nitric acid and ammonium sulphate, the process which comprises neutralizing the solution obtained in the leaching process with ammonia to form a single ammonium phosphate, separating the chief portion of said ammonium phosphate from the solution by evaporation and crystallization, adding calcium nitrate to the mother liquor to precipitate its content of phosphoric acid as insoluble calcium phosphate and increase its percentage of ammonium nitrate, and recovering the ammonium nitrate from the remaining solution by evaporation.

6. In a method of leaching phosphate rock with nitric acid and ammonium sulphate, the process which comprises neutralizing the solution with ammonia in such quantity that monoammonium phosphate solely is formed, separating the chief portion of said ammonium phosphate from the solution by evaporation and crystallization, adding calcium nitrate and ammonia to the mother liquor to precipitate its content of phosphoric acid as insoluble calcium phosphate, and recovering the ammonium nitrate from the remaining solution by evaporation.

7. Method of treating solutions obtained in the leaching of phosphate rock with nitric acid and ammonium sulphate, which comprises neutralizing the solution with ammonia to form a single ammonium phosphate in the solution, separating the chief portion of said ammonium phosphate from the solution by evaporation and crystallization, purifying the mother liquor from its remaining content of ammonium phosphate by precipitation with a soluble calcium salt at a temperature of at least 80° C., and recovering the ammonium nitrate from the purified mother liquor by evaporation.

8. In a method of leaching phosphate rock with nitric acid and ammonium sulphate, the process which comprises neutralizing the solution with ammonia in a quantity insufficient to form diammonium phosphate, concentrating the solution by evaporation, adding a further quantity of ammonia to saturate the phosphoric acid completely to the stage of di-ammonium phosphate, then separating the chief portion of the diammonium phosphate from the solution by evaporation and crystallization, purifying the mother liquor from its remaining content of ammonium phosphate by precipitation with a soluble calcium compound, and recovering the ammonium nitrate from the purified mother liquor by evaporation.

BENGT WADSTED.